United States Patent [19]

Wolf

[11] 4,247,497

[45] Jan. 27, 1981

[54] METHOD FOR PRODUCING A MAT ESPECIALLY IN THE MANUFACTURE OF PARTICLE BOARDS

[75] Inventor: Lutz Wolf, Darmstadt, Fed. Rep. of Germany

[73] Assignee: Firma Carl Schenck AG, Darmstadt, Fed. Rep. of Germany

[21] Appl. No.: 891,747

[22] Filed: Mar. 30, 1978

Related U.S. Application Data

[62] Division of Ser. No. 751,397, Dec. 17, 1976, abandoned.

[30] Foreign Application Priority Data

Dec. 19, 1975 [DE] Fed. Rep. of Germany ....... 2557352

[51] Int. Cl.³ .......... B29J 5/08

[52] U.S. Cl. .......... 264/40.4; 264/113

[58] Field of Search .......... 264/40.4, 113

[56] References Cited

U.S. PATENT DOCUMENTS

| | | | |
|---|---|---|---|
| 2,921,712 | 1/1960 | Dickerson | 222/55 |
| 3,303,967 | 2/1967 | Munson | 222/14 |
| 4,038,531 | 7/1977 | Loe, Jr. | 141/83 |

*Primary Examiner*—Donald E. Czaja

*Assistant Examiner*—James R. Hall

*Attorney, Agent, or Firm*—W. G. Fasse; W. W. Roberts

[57] ABSTRACT

The production of a mat of wood chips and/or fibers, hereafter called wood particles, by a spreading station and a weighing device, is controlled in a closed loop circuit for uniformity, directly during the spreading of the wood particles. Several spreading devices form a spreading station. Electrical signals emanating from a tared weighing device which is arranged downstream of a first spreading device as viewed in the direction of travel of a conveyor belt, are used to control the output of the first spreading device. If desired, the output of one or more spreading devices located downstream of a weighing device may also be controlled in a closed loop circuit, whereby the weight of the partially formed mat moving over the weighing device produces the electrical control signal which is compared to a predetermined reference signal for controlling the production of the finished mat having one or several layers.

5 Claims, 6 Drawing Figures

METHOD FOR PRODUCING A MAT ESPECIALLY IN THE MANUFACTURE OF PARTICLE BOARDS

BACKGROUND OF THE INVENTION

The invention relates to a method for the production of a mat of wood chips or fibers, generally referred to as wood particles, by means of a spreading station and a weighing device.

It is an important consideration in the manufacture of particle boards to achieve a uniform weight distribution of the finished mat. For this purpose it has been proposed in German Patent Publication (DAS) 1,156,219 to use as the basis for determining the specific gravity or density, particle material which is cut out in a known manner from the mat between sections to be pressed. The length and width of such sections correspond to the capacity of a particle board press.

This method of cutting out portions of the mat is involved and hence expensive. In addition, due to the long dead time between spreading and weighing stations, a very slow flow control is obtained. Such slow control can follow only very slow changes in the mat. If a multilayer mat is spread, it is impossible to correct the individual layers in this known manner.

In the present context the term "mat" simply means one or several layers of wood particles prior to subjecting the mat to pressure in a particle board press.

OBJECTS OF THE INVENTION

In view of the foregoing, it is the aim of the invention to achieve the following objects, singly or in combination:

- to provide a method for manufacturing a mat for subsequently forming particle boards in which the weight of wood particles applied to form individual layers, is controlled by monitoring and regulating one or more spreading stations which supply the wood particles onto continuously advancing carrier plates, to obtain a mat having a uniform weight distribution;
- to provide a method for producing a mat of wood particles of any suitable kind by means of which an automatic and substantially continuous monitoring of the mat production under corresponding closed loop control is possible, whereby corrective steps may be taken directly during the production of any individual mat layer and in immediate response to any deviations of measured values from given values of mat weight;
- to control one or more spreading devices by means of a continuously derived weight representing signal obtained in a weighing station arranged upstream and/or downstream of a spreading device controlled in a closed loop circuit; and
- to regulate two separate spreading devices by a single weighing station, cooperating with a closed loop circuit, especially a weighing station arranged intermediate two spreading devices.

SUMMARY OF THE INVENTION

The present invention provides a method in which the spreading of the individual mat layers is continuously controlled or regulated in a closed loop circuit to adjust the amount of wood particles being deposited. The present continuous weight distribution closed loop control method is applicable to various apparatus combinations. For example, the two spreading station may include several spreading devices and weighing means for producing electrical signals. The weighing means may be arranged in any one of a number of positions, preferably downstream of a first spreading device as viewed in the conveyor moving direction. The weighing device is appropriately calibrated to control in a closed loop the output of one or more spreading devices upstream and/or downstream of said weighing means and in response to the partial mat moving over the weighing device and/or in response to other values such as the conveyor speed or the like. The measured weight value is compared with a reference value representing the desired characteristics of the finished mat. It is a particular advantage of the invention that the output of two spreading devices may be controlled simultaneously in a closed loop manner by a single weighing means relative to a predetermined reference value of the finished mat. The measured signals may also be displayed, for example, as digital values.

It is particularly advantageous and economical to use the electrical signals for controlling in a closed-loop manner and indicating the output of at least one spreading device arranged downstream of the first spreading device, whereby also a predetermined reference value representing the finished mat, may be taken into account. This makes it possible to compensate for variations in weight measured in one particular region of a wood particle layer by changes in the respective region of the next partial mat layer, whereby a mat is obtained which, after leaving the final spreading station, can be pressed without any intermediate work steps such as smoothing off or removing material for the purpose of equalizing the weight.

In still another embodiment, signals transmitted by a further calibrated weighing device representing a partial mat layer led over a further weighing device, control the output of a spreading machine in a closed loop manner. The particular advantage of this embodiment is that the uniform weight of the mat can be maintained within an intermediate layer.

The objects of the invention may also be achieved, according to the invention, by arranging an appropriately calibrated weighing device between two spreading machines and to use the signal representing the partial mat passing over the weighing station to control the delivery of at least one spreading machine. This type of control is of advantage particularly if the spread layers are formed by different materials and the weight distribution is carried out within the spreading station.

It is possible to locate a properly calibrated weighing device downstream of the last spreading device. A control signal represents the mat passing over the weighing device and controls in a closed loop manner as well as indicates the output of at least one spreading device arranged upstream of the weighing device, whereby again a predetermined reference value representing the finished mat is taken into account. The particular advantage of this type of control is that the finished mat is passing over a calibrated scale, by which errors in the spreading are detected within a very short time, but not later than the time which a mat section requires for passing over the calibrated scale. As a result, an immediate corrective action may be accomplished to obtain a finished particle board of constant weight, whereby rejects are minimized.

The deviation between the rated and the actual weight of the partial mat or of the finished mat is supplied to a control device in combination with further information representing values such as the weight ratio between partial layers of a mat, the forming conveyor belt velocity and the throughput of the individual spreading stations. The closed loop control device is connected to the calibrated weighing device. This type of control is particularly advantageous, because its control characteristic remains optimally adapted to the production operation even though the individual factors of the control characteristic may change independently of one another. Thus, the belt speed and/or the throughput may be independently varied for controlling the uniformity of the mat in a closed loop manner.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
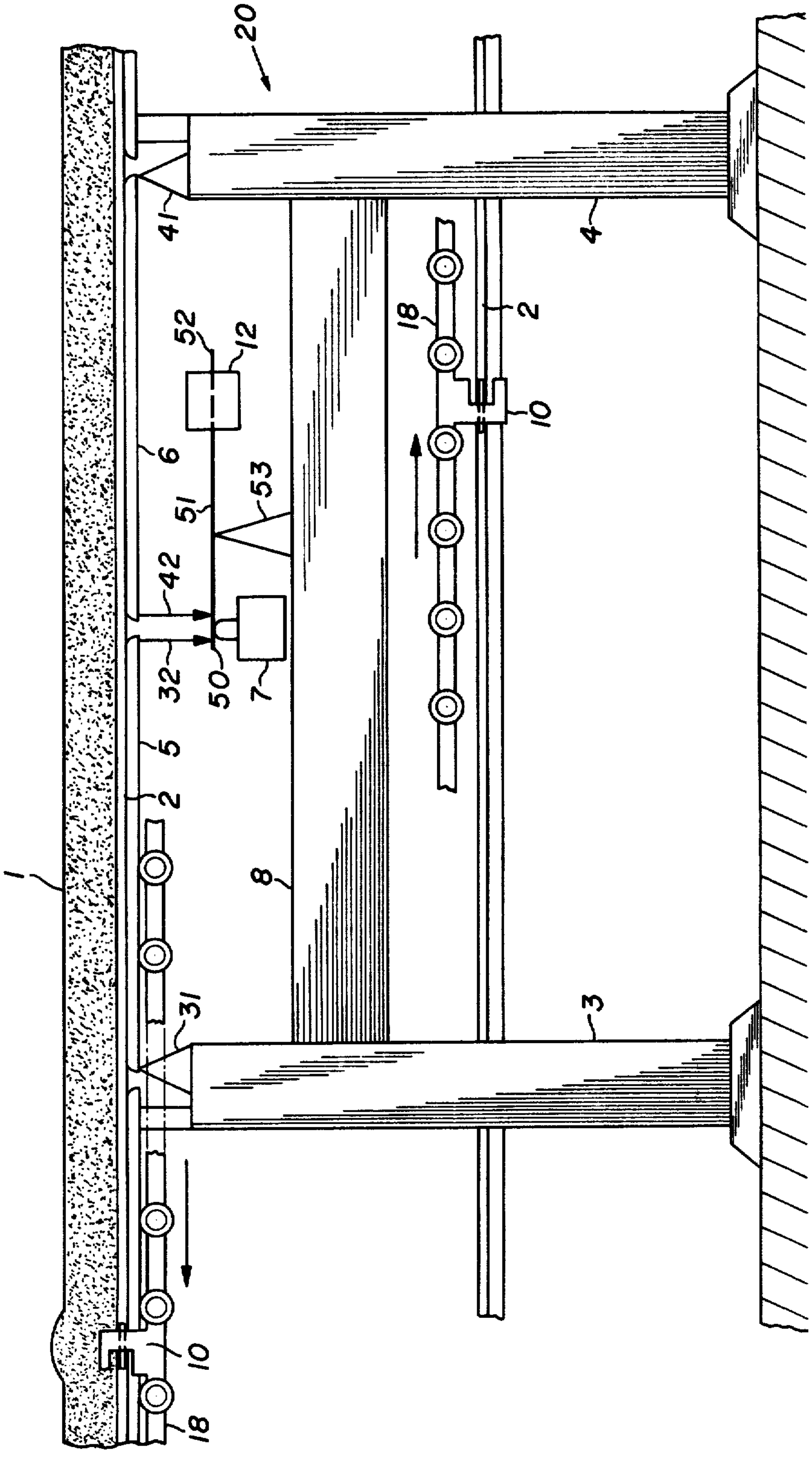
FIG. 1 illustrates schematically a side view of a weighing device for practicing the present invention.

The weighing device is illustrated in FIG. 1. The mat of wood particles 1 is spread by a spreading station not shown in FIG. 1, onto transporting means that may be in the form of flexible supports 2 transported by a conveyor 18 running over a weighing device 20. The weighing device 20 comprises two support columns 3, 4 having support points or ridges 31 and 41 at the upper ends thereof. Weighing carrier plates 5, 6 are supported at one end thereof on these points or ridges 31, 41. Further support elements 32 and 42 carry the plates 5, 6 at the respective other ends thereof. The support elements 32, 42 bear on one end 50 of a scale bar 51. The opposite end 52 of the scale bar 51 is provided with an adjustable taring or calibrating weight 12 to eliminate dead weight. The scale bar 51 is journalled on a scale edge 53 which in turn is supported on a cross beam 8 held by the columns 3, 4. Under the load of the support elements 32, 42 the end 50 of the scale bar 51 engages a load cell 7.

The weighing device 20 with load cell 7 forming part of a scale, is arranged relative to the upper run of conveyor 18 in such a manner that the flexible support means 2 for the mat 1 is moved over the weighing carrier plates 5, 6 by the drive dogs 10 secured to the conveyor 18. Preferably, weighing device 20 will be arranged between the upper and lower runs of the conveyor 18, whereby the lower run will form the return run.

Instead of the arrangement with flexible supports 2 and conveyor chains 18, some other endless conveyor belt, for instance, of plastic, fabric, or steel may be used as the support for the mat 1. Similarly, sheet metal plates transported by a conveyor device may be used as supports for the mat 1.

Due to the downward forces acting on the load cell 7 through the supports 32, 42, the load cell 7 produces an electrical signal which is directly proportional to the weight of the mat of wood particles on the weighing carrier plates 5 and 6 of weighing device 20. This signal represents the actual or measured value in the control loop of the spreading apparatus. This signal is electrically amplified and indicated in a manner well known in the art. The weight of the plates 5 and 6 and of the supports 2 is tared out or calibrated out by balancing a weight 12 adjustable back and forth on the free end 52 of scale bar 51. Upon proper adjustment of the weight 12, only the actual weight of the mat 1 is taken into account. Electrical means may be used in an alternative embodiment to eliminate tare weight, if desired.

Figure 2:
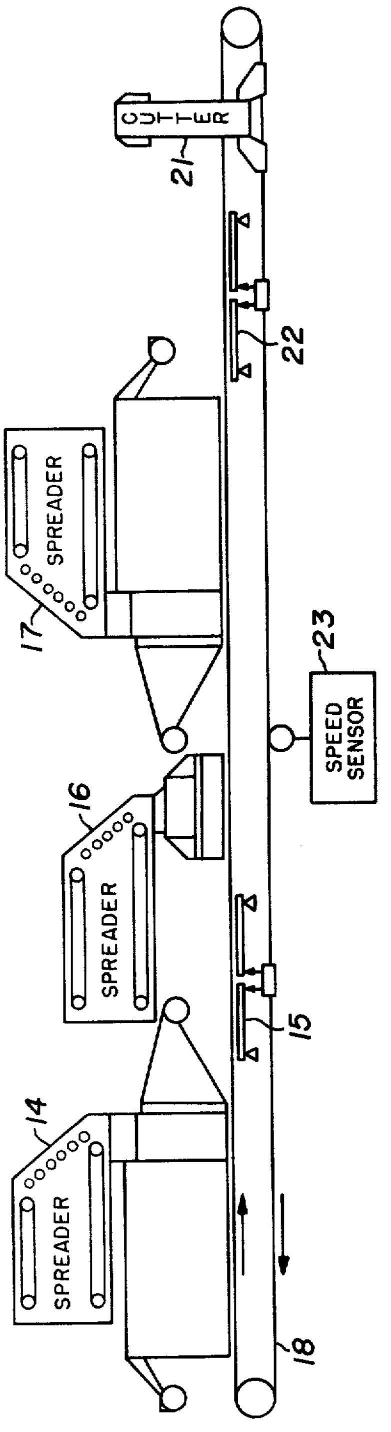
FIG. 2 illustrates schematically a multilayer spreading station with two weighing devices.

The multilayer spreading station shown in FIG. 2, comprises a first spreader 17 which forms a bottom layer and a last spreader 17 which forms a top layer. A center layer is formed by a spreading device 16. A weighing device 15 is located between spreading device 14 and last spreader 16. A further weighing device 22 is located downstream of spreading device 17. A cutter 21 is located near the downstream end of mat forming conveyor belt 18. The weighing devices 15 and 22 are the same as the weighing device 20 described above and shown in FIG. 1. The spreading devices are conventional.

The spreader 14 includes a conventional air spreading chamber, which deposits the wood particles on forming conveyor belt 18 as a bottom layer of the mat 1. The bottom layer passes immediately after the spreading over the weighing device 15. According to the invention, the electrical signals from the weighing device 15 may be used to control either the quantity delivered by any of the spreaders, e.g., the center layer spreader 16 may be controlled to produce a predetermined desired weight, and/or the spreaders 14, 17 may be controlled to specifically regulate in a closed loop manner, the top and bottom layers of the mat 1. In any event, the control signals may take a reference value into account as described below with reference to FIGS. 3 and 4.

When only the bottom and top layer spreaders 14 and 17 are controlled relative to a predetermined reference value, the weighing device 15 determines downstream of the first spreader 14, the weight per meter of the bottom layer. This value is compared continuously with a predetermined reference value. If deviations occur, the quantities delivered by the spreaders 14, 17 which are equipped, for instance with speed-controlled d-c drives, are varied. The top run of the conveyor 18 moves from left to right in FIG. 2 and FIG. 4.

The spreaders 14 and 17 form a pair and are influenced or controlled in the same closed loop manner. The two spreaders are identical and spread the same wood particle material. Both spreaders 14 and 17 have the same delivery characteristics and may be controlled by a single weighing device 15. In this closed loop control the control characteristics may also be influenced by the velocity of the forming conveyor belt 18.

Instead of controlling the two spreaders 14 and 17, the weight of the layers may be controlled by means of center layer spreader 16. In such an embodiment the signal from the weighing device 15 is utilized for adjusting the output of the spreader 16. Assuming that the bottom and top layer spreaders 14 and 17, as explained above, have a constant output characteristic, a mat of constant weight can be produced with a single weighing device 15, which is located between the spreader 14 and the center layer spreader 16. Thus, using the weighing device 22 shown in FIG. 2 may not be necessary.

For various manufacturing processes it is advantageous, if the spreading of the bottom and top layers is constant, uninfluenced by any control processes which would cause a thickness change in these layers. If the center layer is produced by several center layer spreaders arranged in tandem and the respective weighing device is arranged between two center layer spreading devices, the deviation of the electric weight representing signal from the reference value is utilized to readjust the output of one of the center layer spreaders. If the signal emitted by the weighing device reaches a magnitude such that the defect caused by incorrect center layer spreading cannot be compensated by a single center layer spreading station, it is a particular advantage of the invention that the weighing device 15 may be arranged between the last center layer spreader and the top layer spreader 17 so that the pulses emitted by the weighing device 15 can be supplied to more than one center layer spreader, whereby the mat produced will have a constant weight with a single weighing device in a particularly advantageous manner.

The weighing devices 15 and 22 shown in FIG. 2 may be employed in a further particularly advantageous manner if the weighing device 15 controls the bottom and top layer spreaders 14 and 17 in a closed loop manner to provide a constant spreader output, while the following weighing device 22 adjusts the center layer spreader 16, similarly in a closed loop manner to a predetermined reference value if there is a deviation from the reference value. According to experience, larger errors may occur in the region of the center layer spreading. Such errors are mainly caused by changes in the piling density and may also be due to changing wood assortments or due to changes in the cutting efficiency during the cutter life in producing the wood particles. Hence, it is necessary that such deviations between the reference value and the actual value of the center layer spreader 16 or spreaders are compensated to avoid changes in the respective output to prevent rejects.

According to the invention, the foregoing control is provided by a closed control loop which, in addition to the control deviation, i.e., the deviation between the desired and the actual value of the weight of the mat, also takes into account the ratio between the bottom, top and center layers of the mat being formed as well as the forming belt velocity for controlling the formation of the center layer. The closed control loop can accept mutually independent changes of the several factors according to any particular production program, and the characteristic of the closed control loop remains optimally adjusted. The control devices necessary to interrelate the partial mats, and information regarding the belt velocity and the throughput or output of the individual spreading stations, are well known in the art. They are illustrated in block form in FIGS. 3 and 4.

The weighing device 22, which is located downstream of the top layer spreading device 17, may be connected to a recording device, not shown, which continuously records the weight per unit area of the formed mat. This feature provides a very good monitoring and a comparison between the spread wood particles and the finished particle boards. Cutter 21 located downstream of the weighing device 22 cuts the mat into blanks, which are pressed into particle boards in a press, not shown.

Figure 3:
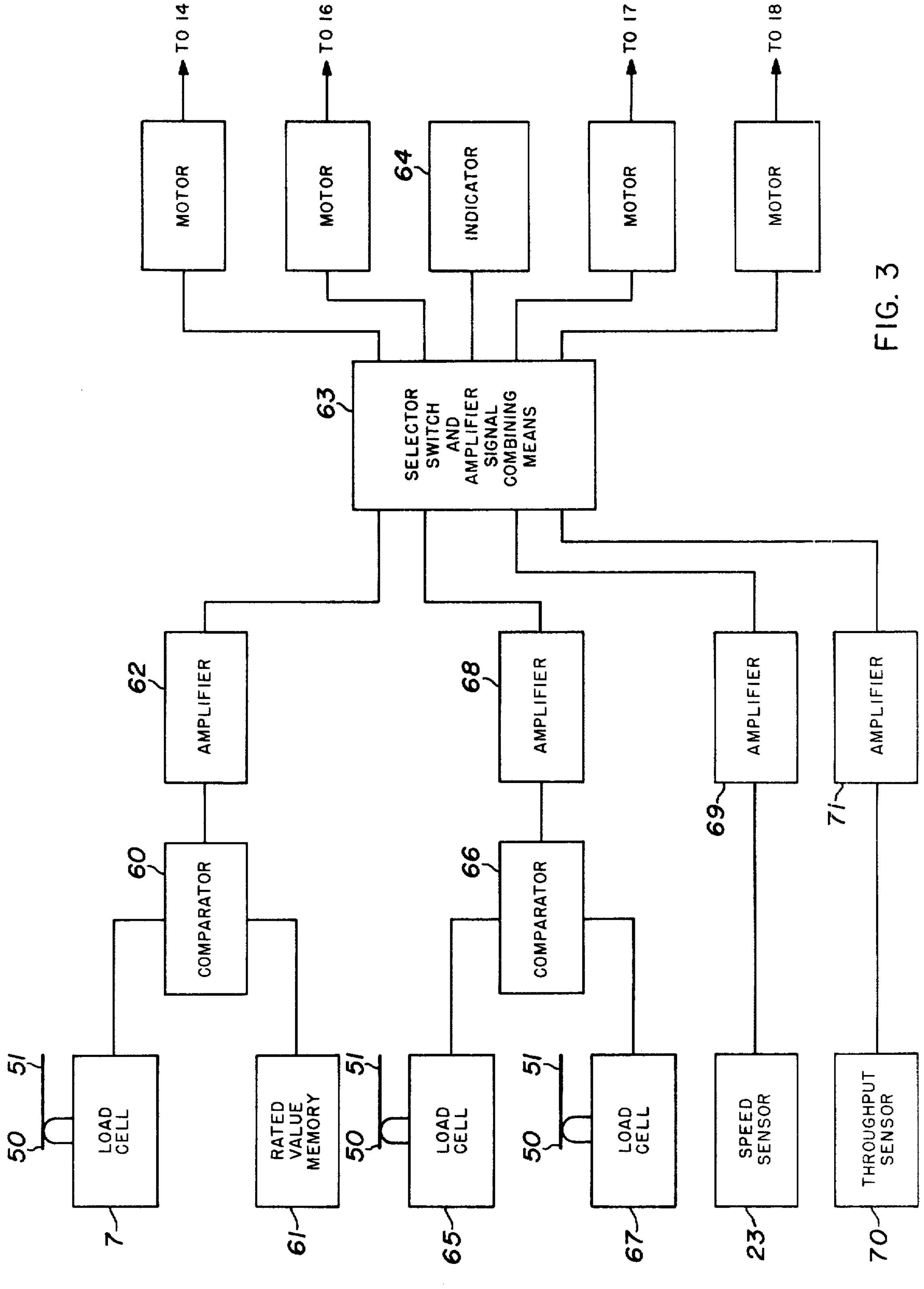
FIG. 3 is a block diagram of a control circuit for practicing the invention with three weighing stations, a speed sensor and a throughput sensor.

FIG. 3 shows a block diagram of the control elements. The load cell 7 provides a weight per unit area representing signal to the comparator 60 which also receives a reference value representing signal from the memory 61. The output of the comparator 60 is connected to an amplifier 62, which in turn is connected through conventional selector and signal combining circuit means 63 to the drive motors for the spreaders 14, 16, and/or 17. An indicator 64 such as a digital or analog display device is also connected to the selector and signal combining means 63. The drive motors may be conventional d-c speed control motors.

A further load cell 65 representing a weighing device of the same kind as illustrated in FIG. 1 is connected to comparator 66 which also receives a weight signal from an additional load cell 67, again representing a weighing device as shown in FIG. 1.

The load cells 7 and 67 as shown in FIG. 3 determine the weight of the first layer from spreading device 14 and of a further layer from spreading device 16 or 17. The comparator 66 then compares the two weight representing signals relative to each other. The output of the comparator 66 is connected through an amplifier 68 to the selector and signal combining means 63.

A speed sensor 23 which may ascertain the speed of the conveyor belt 18 as shown in FIG. 2, provides a speed representing signal at its output which is connected to the amplifier 69, the output of which in turn is connected to the selector and signal combining means 63. Similarly, a conventional throughput sensor 70 connected to any of the spreaders 14, 16, and/or 17 provides a throughput representing signal which is amplified in the amplifier 71, the output of which is also connected to the selector and signal combining means 63. This selector and signal combination circuit means permit the control of the various controllable elements, such as the drive motors, in response to any one of several control input signals, whereby the closed loop control in response to one control input signal may be independent of the control in response to any other control input signal, whereby the respective controls may be applied simultaneously or sequentially.

Figure 4:
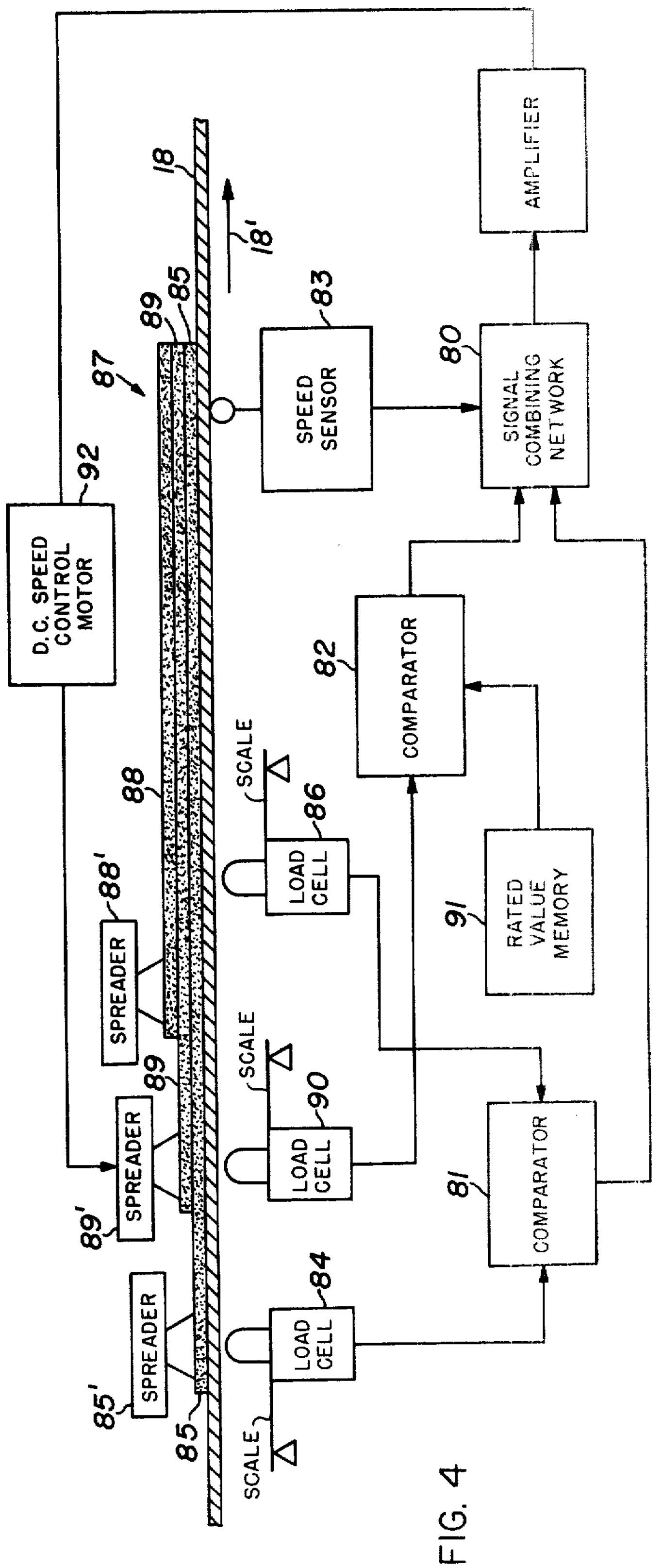
FIG. 4 is a closed loop control circuit block diagram in which signals from three weighing stations and from a speed sensor are combined.

FIG. 4 illustrates an example of a closed loop control circuit, wherein three control signals are supplied to a conventional signal combining network 80. The first control signal is a weight ratio representing signal provided at the output of a comparator 81. The second control signal is a reference signal provided at the output at the comparator 82. The third control signal is a conveyor speed representing signal from the speed sensor 83. A load cell 84 and respective scale sense the weight of the bottom mat layer 85 on the conveyor belt 18 moving in the direction 18'. A load cell 86 and respective scale sense the weight of the entire mat 87 including the top layer 88. The two load cells 84 and 86 are connected to the comparator 81. The bottom layer 85 and the center layer 89 are sensed by a load cell 90 and respective scale for comparing in comparator 82 with a reference signal from memory 91. The output from the signal combining network 80 is supplied, preferably amplified, to a d-c speed control motor 92 which may be used to control the intermediate spreader 89' which spreads the center layer 89. However, if desired any of the other spreaders 85' and/or 88' may be similarly controlled in a closed loop control circuit as shown.

Figure 5:
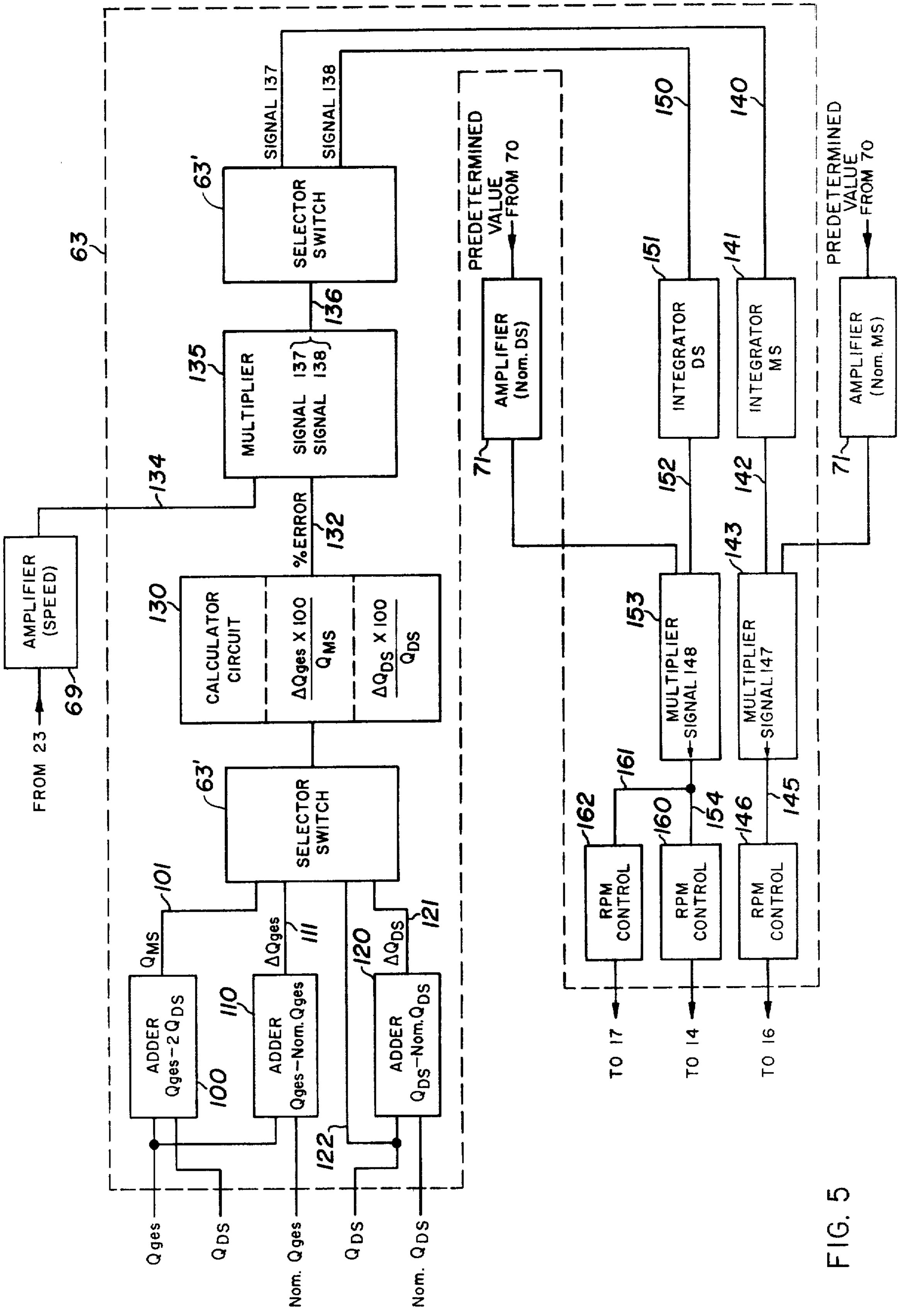
FIG. 5 shows further details of a signal combining network shown in block form in FIG. 3 and including signal selector switch means.

FIG. 5 illustrates a specific example of a signal combining network, which is an integrated part of the selector and signal combining means 63. The electrical signal $Q_{ges}$ of the weighing device 22, which is directly proportional to the actual total weight of the mat, and the electrical signal $Q_{DS}$ of the weighing device 15, which is proportional to the actual weight of the bottom layer, are both fed to an adding circuit 100, where the difference is formed between the signal coming from the weighing device 22 and twice the signal coming from the weighing device 15. The result of this operation is a signal $Q_{MS}$ which is directly proportional to the actual weight of the center layer. This signal $Q_{MS}$ is fed via line 101 to the selector switch 63'.

The difference between the electrical signal $Q_{ges}$ representing the actual total weight of the mat and the electrical signal $N_{om}Q_{ges}$ of the nominal total weight of the mat is formed in a second adding circuit 110 providing at its output 111 the difference signal $\Delta Q_{ges}$. This difference signal $\Delta Q_{ges}$ is the deviation which is fed through conductor 111 to the selector switch 63'.

A third adding circuit 120 forms the difference between the signal $Q_{DS}$ which is proportional to the actual weight of the bottom layer and the signal $N_{om}Q_{DS}$ which is the nominal weight of the bottom layer. The resulting signal $\Delta Q_{DS}$ is the deviation and is fed through conductor 121 to the selector switch 63'. The signal $Q_{DS}$, which is proportional to the actual weight of the bottom layer, is fed separately through conductor 122 to the selector switch 63'. An electrical quotient calculating circuit 130 receives from the selector switch 63', on the one hand, the signals coming through conductors 101 and 111 whereby both signals $Q_{MS}$ and $\Delta Q_{ges}$ are combined in the circuit 130 and the resulting signal is the error in percent of the weight of the mat relative to the actual weight of the center layer. On the other hand the electrical quotient calculating circuit 130 receives the signals coming through conductors 121 and 122 which signals $Q_{DS}$ and $\Delta Q_{DS}$ are combined and the resulting signal is the error in percent of the weight of the bottom layer relative to the actual weight of the bottom layer. Both resulting signals are fed through conductor 132 to a multiplier 135 which also receives a further signal from the amplifier 69 (see FIG. 3) through conductor 134, which is proportional to the speed of the belt 18. These signals are combined in the multiplier 135. When the signals corresponding to "error center layer" and to the speed are combined, the resulting signal is a control signal 137 for controlling the spreader 16. When the signals corresponding to "error bottom layer" and to the speed are combined in multiplier 135 the resulting signal is a control signal 138 for controlling the spreaders 14 and 17. The control signals 137, 138 are fed to a further selector switch 63'' through conductor 136. The control signal 137 is fed through conductor 140 to an integrator 141 wherein the signal is integrated and the resulting signal is fed by conductor 142 to a further multiplier 143. Multiplier 143 receives a further signal from amplifier 71, which amplifies the signal from the throughput sensor 70 corresponding to the nominal weight of the center layer.

When signal 137 and the signal from amplifier 71 are multiplied, the product is signal 147 which is fed by conductor 145 to a speed control system 146, which controls the output of the spreader 16 whereby the spreader 16 establishes the correct output of wood particles.

Control signal 138 is fed by conductor 150 to integrator 151, and the resulting signal is fed by conductor 152 to a multiplier 153. Multiplier 153 also receives a signal from an amplifier 71' which amplifies the signal of the throughput sensor 70 corresponding to the nominal weight of an outer layer. When signal 138 and the signal from amplifier 71' are multiplied the product is signal 148 which is fed by conductor 154 to the speed control system 160, which controls the output of the spreader 14, and by conductor 161 to the speed control system 162, which controls the output of spreader 17. Signals 147 and 148 provide a value, which is in balance with the nominal value of the weight of the final mat.

Figure 6:
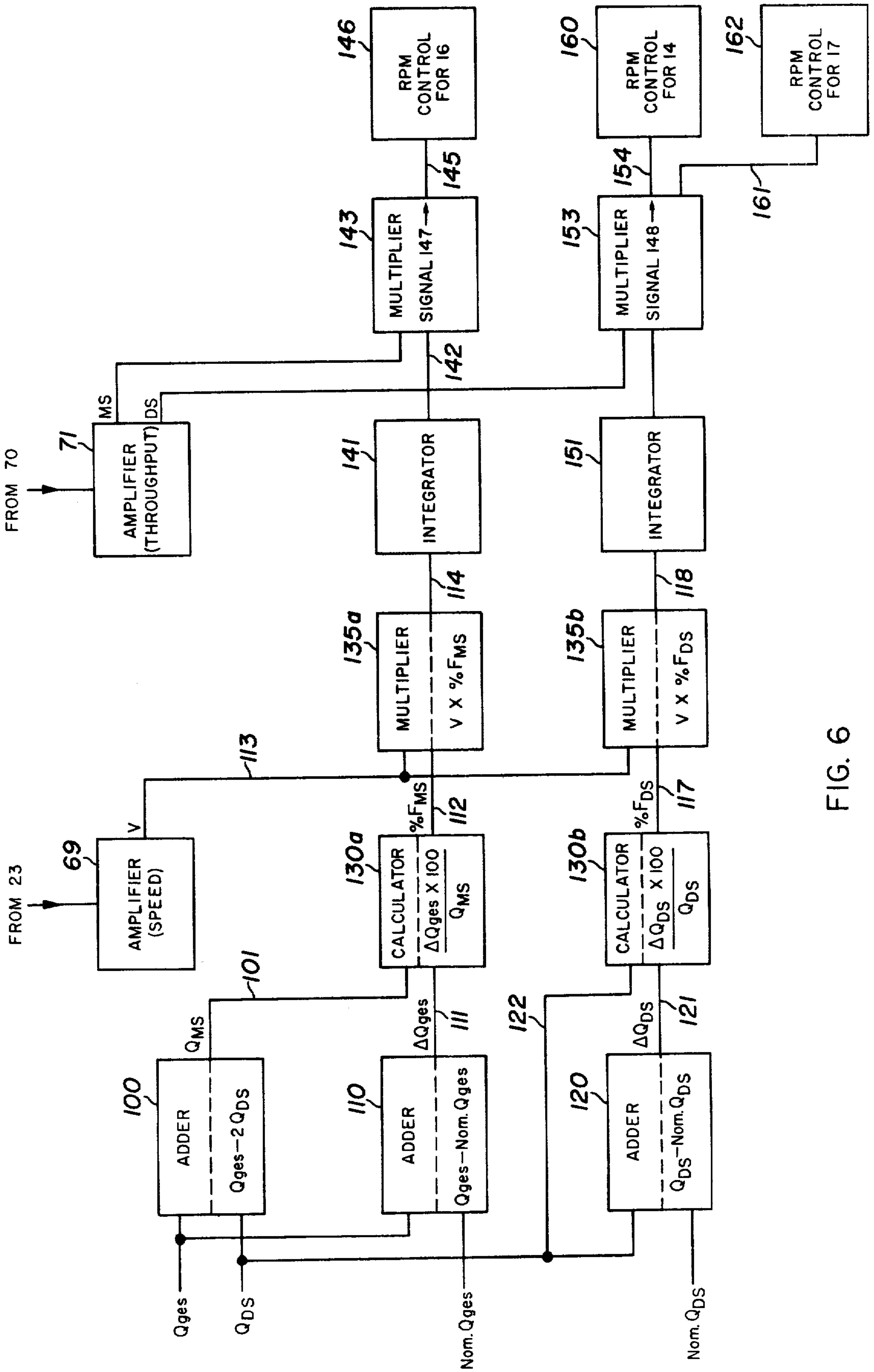
FIG. 6 is a signal combining network without a signal selector switch.

FIG. 6 shows an example of a signal combining network without the selector switches 63' and 63''. The circuits are provided with the same reference numerals as in FIG. 5, when they have the same effect as disclosed in the description of FIG. 5. The adding circuit 100 receives the signals corresponding to the actual total weight $Q_{ges}$ and the actual weight of one cover layer $Q_{DS}$ forming the top or bottom layer. The signal at the output of circuit 100 is fed by conductor 101 to a quotient circuit 130*a* which forms from the signal $\Delta Q_{ges}$ on output conductor 111 of adding circuit 110 and from the $Q_{MS}$ on output conductor 101 of adder 100, an error signal $F_{MS}$ in percent of the total weight of the mat relative to the actual weight of the center layer. This output signal $F_{MS}$ is fed through conductor 112 to a multiplier 135*a*. The multiplier 135*a* also receives through conductor 113 a speed signal V from the amplifier 69. The two signals are combined and the signal at the output of the multiplier 135*a* is fed through conductor 114 to an integrator 141. The signal at the output of integrator 141 is fed through conductor 142 to the multiplier 143 which also receives a throughput signal MS from the amplifier 71. The resulting product is a signal 147 which is fed through conductor 145 to the speed control system 146 which controls the output of spreader 16.

Spreaders 14 and 17 are controlled in a similar way as disclosed for the spreader 16. The signals are fed from the output of adding circuit 120 through conductor 121 to the quotient circuit 130*b* which receives a further information signal $Q_{DS}$ through conductor 122. The resulting signal is fed through conductor 117 to multiplier 135*b*. Multiplier 135*b* receives a further signal V representing the speed from line 113. The resulting signal is fed through conductor 118 to an integrator 151. The output signal from integrator 151 is fed to the multiplier 153. Multiplier 153 receives a further signal DS corresponding to the throughput from amplifier 71'. The product is a signal 148 which is fed through conductor 154 to the speed control system 160 for controlling the spreader 14 and through conductor 161 to the speed control system 162, which controls the output of the spreader 17. Signals 147 and 148 provide a value which is in balance with the nominal value of the weight of the mat.

Although the invention has been described with reference to specific example embodiments, it is to be understood, that it is intended to cover all modifications and equivalents within the scope of the appended claims.

I claim:

1. A method for producing a multi-layered mat having a uniform weight distribution of deposited wood particles, for subsequently forming particle boards, comprising:

(a) depositing from a plurality of controlled spreaders in series a plurality of layers of wood particles upon a moving conveyor to form a continuous multi-layered mat, (b) weighing said moving mat at a tared weighing station beneath said conveyor downstream of said first spreader to measure the output of wood particles from said first spreader, and producing at said weighing station an electrical signal representing the weight of said mat formed by said first spreader, (c) comparing said produced signal to a reference signal to produce a control signal, and (d) directing said control signal to said first spreader and to the last spreader to control, in response thereto, the output of wood particles deposited as the first layer from said first spreader and from the last spreader to form a multi-layered mat having a uniform weight distribution.

2. The method of claim 1, comprising the further step of controlling with said control signal the output of wood particles from a spreader located downstream of said first spreader and downstream of said tared weighing station but upstream of said last spreader.

3. The method of claim 1, comprising operatively locating a further tared weighing station downstream of said last spreader to produce a further signal representing the weight of the mat formed by all spreaders, comparing said further signal with the signal produced at said first mentioned weighing station to produce a further control signal, and controlling with said further control signal one of said plurality of spreaders to correct the output of wood particles of said one spreader in response to said further control signal.

4. The method of claim 1, comprising the steps of locating said tared weighing station between any two spreaders, producing said control signal by comparing the signal from said tared weighing station with a reference signal and applying the control signal to at least one of said two spreaders to control the output of wood particles of said one spreader in response to said control signal.

5. A method for producing a multi-layered mat of wood particles on a moving conveyor, by means of a plurality of controllable spreaders for said wood particles, said spreaders being arranged in series for depositing the wood particles on said moving conveyor, and by means of a plurality of tared weighing stations, said produced multi-layered mat having a uniform weight distribution prior to forming said produced multi-layered mat into particle boards, comprising the following steps:

(a) depositing a plurality of layers of wood particle material on said moving conveyor by means of said plurality of controllable spreaders, (b) weighing said deposited wood particles moving on said conveyor downstream of a first spreader with a first tared weighing station producing a first electrical signal corresponding to the weight of a layer of wood particles spread by said first spreader, (c) weighing said deposited wood particles moving on said conveyor downstream of a last spreader with a second tared weighing station producing a second electrical signal corresponding to the weight of the layers of wood particles downstream of said last spreader, (d) comparing said first electrical signal with said second electrical signal to produce a first difference signal, (e) weighing said deposited wood particles moving on said conveyor between two spreaders with a third tared weighing station producing a third electrical signal corresponding to the weight of the layers of wood particles at said third tared weighing station, (f) comparing the third electrical signal to a predetermined reference signal to produce a second difference signal, (g) supplying said first and second difference signals to a signal combining network, (h) generating a mat production information representing signal and supplying said mat production information representing signal also to said signal combining network to produce a control signal, and (i) supplying said control signal to any one of said plurality of spreaders to control the output of wood particles of the respective spreader whereby the weight of any individual layer of wood particles may be corrected during the production of the respective layer and whereby the mat has a uniform weight distribution.

* * * * *